(12) United States Patent
Yu

(10) Patent No.: US 7,030,592 B2
(45) Date of Patent: Apr. 18, 2006

(54) BATTERY CHARGER AMUSEMENT DEVICE

(76) Inventor: Sun Yu, 2850 Coolidge Hwy., Berkley, MI (US) 48072

( * ) Notice: Subject to any disclaimer, the term of this patent is extended or adjusted under 35 U.S.C. 154(b) by 0 days.

(21) Appl. No.: 10/101,907

(22) Filed: Mar. 19, 2002

(65) Prior Publication Data
US 2003/0178971 A1 Sep. 25, 2003

(51) Int. Cl.
H02J 7/00 (2006.01)
(52) U.S. Cl. .................. 320/137; 320/113
(58) Field of Classification Search ............ 320/132, 320/106, 107, 160, 117, 161, 164, 115, 110, 320/39, 20, 125, 114, 48, 137, 134, 136; 446/356, 353, 175, 457, 390; 429/96, 100, 429/49
See application file for complete search history.

(56) References Cited

U.S. PATENT DOCUMENTS

| | | | |
|---|---|---|---|
| 3,629,680 A | 12/1971 | Baynes et al. ............ 320/2 |
| 4,101,818 A * | 7/1978 | Kelly et al. ............ 320/110 |
| 4,766,361 A * | 8/1988 | Pusateri .................. 320/110 |
| 4,891,029 A | 1/1990 | Hutchinson ............. 446/58 |
| 5,057,761 A * | 10/1991 | Felegyhazi, Sr. ......... 320/110 |
| 5,061,579 A * | 10/1991 | Ishimoto ................. 429/96 |
| 5,115,182 A * | 5/1992 | Ehmke et al. ............ 320/14 |
| 5,157,320 A * | 10/1992 | Kuriloff ................. 320/151 |
| 5,164,652 A * | 11/1992 | Johnson et al. .......... 320/110 |
| 5,371,453 A * | 12/1994 | Fernandez ............... 320/136 |
| 5,371,456 A * | 12/1994 | Brainard ................ 320/161 |
| 5,534,765 A * | 7/1996 | Kreisinger et al. ........ 320/106 |
| 5,686,811 A * | 11/1997 | Bushong et al. .......... 429/96 |
| 5,767,655 A | 6/1998 | Ostendorff et al. ........ 320/2 |
| 5,818,197 A * | 10/1998 | Miller et al. ............. 320/107 |
| 5,892,350 A * | 4/1999 | Yoshikawa .............. 320/107 |
| 6,142,846 A * | 11/2000 | Ojakaar .................. 446/72 |
| 6,171,171 B1 | 1/2001 | Barthold ................. 446/438 |
| D438,171 S | 2/2001 | Tang et al. ............... D13/107 |
| D446,500 S | 8/2001 | Krieger et al. ............ D13/110 |
| 6,326,767 B1 * | 12/2001 | Small et al. .............. 320/116 |
| 6,424,120 B1 * | 7/2002 | Chen ..................... 320/125 |
| 6,546,436 B1 * | 4/2003 | Fainmesser et al. ......... 710/5 |
| 6,652,352 B1 * | 11/2003 | MacArthur et al. ........ 446/356 |
| 6,696,922 B1 * | 2/2004 | Wong et al. ............. 340/7.32 |
| 6,764,373 B1 * | 7/2004 | Osawa et al. ............. 446/175 |
| 2002/0063550 A1* | 5/2002 | Chen et al. .............. 320/110 |

* cited by examiner

Primary Examiner—Rajnikant B. Patel
(74) Attorney, Agent, or Firm—Gifford, Krass, Groh, Sprinkle, Anderson & Citkowski, P.C.

(57) ABSTRACT

A battery charger amusement has a receptacle adapted to receive a rechargeable battery and an electronic circuit communicating information stored within the device that is independent of charge status. The battery charger can include a motion actuator so as to move during the battery recharge process or includes a synthesizer so as to utter spoken utterances that are independent of charge status during the process. The device is intended to encourage the use of rechargeable batteries over a disposable counterpart.

10 Claims, 2 Drawing Sheets

BATTERY CHARGER AMUSEMENT DEVICE

FIELD OF THE INVENTION

The present invention relates to a battery charger device activated by the insertion of a battery to provide educational or entertainment routines.

BACKGROUND OF THE INVENTION

The societal cost of disposable batteries will be felt for generations to come as leachants find their way into soil and ground water. While recent advances in dry cell technology have reduced the toxicity of corroding disposable batteries, the sheer quantity of discarded batteries represents a significant burden on landfills. Annual domestic consumption of disposable batteries exceeds 1.9 billion cells. In most instances, disposable batteries cost a consumer more over time than does a rechargeable battery, yet disposable batteries remain popular owing to the inconvenience of battery charging. Thus, there exists a need for a battery charger device that provides communication with the user other than battery charge status so as to encourage the battery charge. It is intended that with the usage of the present invention, chargeable batteries displace evermore disposable cells.

SUMMARY OF THE INVENTION

A battery charger amusement device includes a battery charger having a receptacle adapted to receive a rechargeable battery and an electronic circuit communicating information stored within the device. The information that is communicated is independent of the battery charge status. Alternatively, the electronic circuit communicates spoken utterances independent of charge status.

A battery charger amusement device in addition to a battery charger and an electronic circuit includes a motion actuator, the motion actuator operating while a rechargeable battery is within the receptacle.

A battery charger amusement device is also contemplated including a user input interface coupled to an electronic circuit and a memory coupled to the interface and electronic circuit. The resulting device has a high degree of interactivity.

DESCRIPTION OF THE PREFERRED EMBODIMENT

The present invention is intended to add amusement value to the task of battery charging. Upon a rechargeable battery being coupled to an inventive device, an electronic circuit is activated that communicates information independent of charge status to a user. The form and content of the information so supplied is not critical. The housing for the inventive device can take on any shape and color and be modeled into any number of humanoid, animal, vehicle, imaginary or natural forms. Similarly, the housing texture and materials of construction are not critical limitations.

Figure 1:
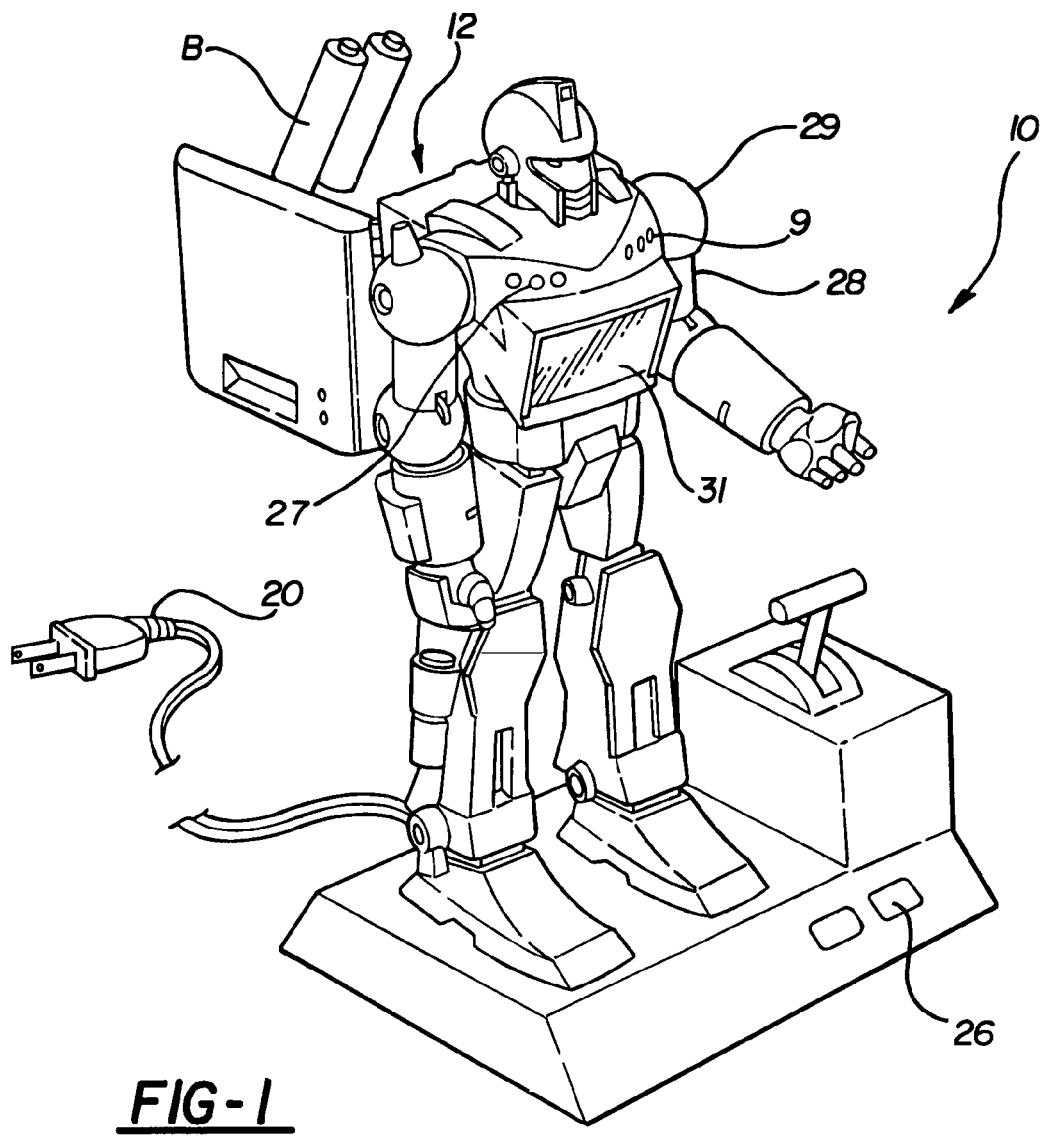
FIG. 1 is a perspective view of a battery charger amusement device according to the present invention.
Figure 1A:
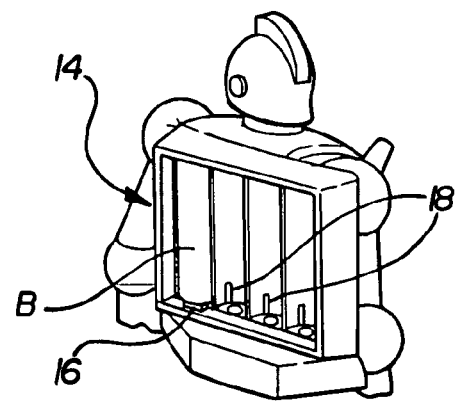

Referring now to FIG. 1, a battery charger amusement device according to the present invention is shown generally at 10. The device includes a conventional battery charger 12 including a receptacle 14 adapted to receive at least one rechargeable battery B. The insertion of a battery B into the receptacle 14 or a manual action activates a mechanical or electrical switch 16 which in turn initiates an electronic circuit 18 to begin the communication of information independent of charge status. It is appreciated that any number of conventional battery chargers is operative herein upon modification to include a switch 16. Representative of the battery chargers operative herewith are those disclosed in U.S. Pat. No. 4,237,409. Typical of a conventional battery charger, is a graphical icon 19 or LED 19' indicative of the charge status of a battery B. It is appreciated that the size and type of battery B is not critical to the present invention. For example, nickel-cadmium, metal hydride, acid, and polymeric batteries are operative herein. Operative battery sized illustratively include 24 volt, 12 volt, 9 volt, AAA, AA, B, C, and D sized cells. Power sources to drive the battery charger 12 and the electronic circuit 18 include line power, a direct current generator, a dynamo and solar cell. It is appreciated that a transformer or adaptor 20 is often required based on the power characteristics of the source P. Optionally, an inventive battery charger 12 further includes an alternating current (AC) coupler as the transformer or adaptor 20.

The electronic circuit 18 in simplest form integrates a light source, laser diode or other electronic component so as to communicate sound or light information stored within the device on an integrated circuit or on a replaceable memory storage device to a user upon insertion of a battery B. The inventive device communicates information upon insertion of a rechargeable battery or through any activation switch being engaged. In alternate embodiments, the device communicates information in the form of spoken utterances or motion. Optionally, electronic circuit 18 is coupled to an information communicating component illustratively including an electric motor, a light source, a video display, a sound synthesizer, or combination thereof. In a preferred embodiment, the electronic circuit 18 includes a microprocessor (not shown) to facilitate more sophisticated communication. In a still more preferred embodiment, a microprocessor is coupled to a memory or data reading device, illustratively including a DRAM chip, CD player, DVD, hard drive, floppy disk drive, and cassette player, and combinations thereof. In still another preferred embodiment, the electronic circuit 18 is coupled to a user input interface 26. A user input interface 26 provides for an interactive question and answer format between a user and the inventive device or, data entry or icon manipulation as part of a gaming system.

The inventive device preferably includes a housing 28. Preferably, the housing is configured to have the appearance of a person, robot, animated character, animal, a vehicle or an object found in nature such as a mountain, tree, or a diorama. The housing 28 is really constructed from a variety of durable materials consistent with proximity to electronic circuitry and a battery charger. These housing materials illustratively include plastics, polymeric resins, textile plush, metal, and recycled forms thereof. In the embodiment depicted in FIG. 1, the housing 28 is configured in the form of a robot having moveable jointed appendages 29, LEDs 27, a sound synthesizer 9, and a video display 31 of which are activated engaging a switch 33 or upon insertion of a battery B therein. Optionally, the device of FIG. 1 further includes an information memory or reader device, hereinafter referred to as an "information source" (not shown) for the uploading of information content and programs, as well as a user input keypad illustratively including a compact disk (CD) player, DVD, floppy disk drive, ZIP disk drive and the like. The embodiment depicted in FIG. 1 preferably also includes a microprocessor (not shown) operating to drive the information communicating functions. It is appreciated that somewhere all of these information communicating components can be incorporated into a different form of housing illustratively including a drive-in movie theater, racing pit-stop, or service station where the spent battery B is loaded into a receptacle incorporated into a model car or other portion of the housing.

It is appreciated that in addition to the entertainment or education information content provided by the inventive device, in a preferred embodiment, information regarding the battery charge status is also provided as per a conventional battery charger. As is conventional to battery chargers, a battery B is monitored as to voltage and current during the charging process.

Figure 2:
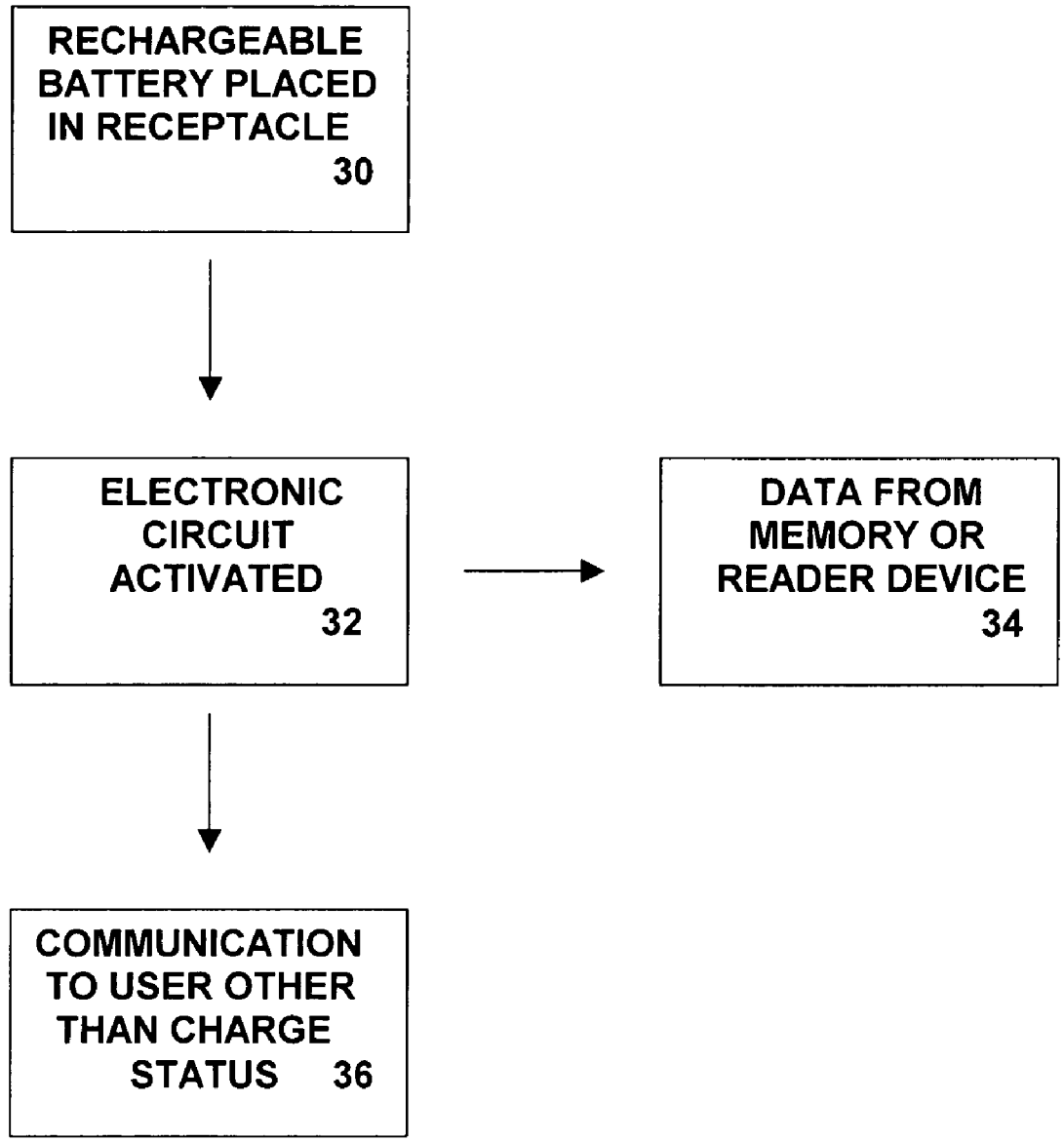
FIG. 2 is a flowchart depicting a use process for the present invention.

Referring now to FIG. 2, the operation of an inventive battery charger amusement device coupled to a power source is initiated by placing a rechargeable battery into a battery rechargeable receptacle 30 for a charging duration or by a user activation switch 33. The contact of the rechargeable battery B with the battery charger or the activation switch 33 initiates an electronic circuit 32 optionally receiving content or executable programs from a memory device or reader 34. The electronic circuit then begins to communicate information to a user independent of the battery charge status 36. The information being in the form of spoken utterances, music, light or movement. Preferably, battery charge status information is also provided 38. Battery charge status as used herein is defined to include contact with battery charger terminals, ability of battery to accept a charge, and the dynamic current and voltage status of the battery. User inputs 40 are prompted by the inventive device and knowledge for coordination-based interactive game formats.

All references cited herein are hereby incorporated by reference to the same extent as if each reference was individually and specifically incorporated by reference. These references are indicative of the levels of skill in the art at the time of invention.

A particular embodiment of the invention have been detailed herein, it is appreciated the changes and modifications may be made by those skilled in the art without departing from the invention in its broader aspects. The embodiments described herein are considered exemplary and not intended to limit the scope of the appended claims.

The invention claimed is:

1. A battery charger amusement device comprising:
   a battery charger having a receptacle for receiving a rechargeable battery, the battery having a charge status;
   a source of information communicated to a user and selected from the group consisting of: sound, light, or a combination thereof for entertaining the user of the device, the information being independent of battery charge status; and
   an activator switch for the source, operative at least at such time as a rechargeable battery is disposed in said receptacle, to energize the information source to generate an output of the information.

2. The device of claim 1 wherein the information is of a type selected from the group consisting of language, text, music, and video.

3. The device of claim 1 further comprising a housing configured in a form selected from the group consisting of humanoid, animate, vehicular and natural.

4. The device of claim 3 wherein the housing has a movable portion.

5. The device of claim 1 wherein the device comprises a video display.

6. A battery charger amusement device comprising:
   a battery charger having a receptacle for receiving a rechargeable battery, the battery having a charge status;
   a source of information communicated to a user and selected from the group consisting of: sound, light, or a combination thereof for educating the user of the device, the information being independent of battery charge status; and
   an activator switch for the source, operative at least at such time as a rechargeable battery is disposed in said receptacle, to energize the information source to generate an output of the information.

7. The device of claim 6 wherein the information is of a type selected from the group consisting of language, text, music, and video.

8. The device of claim 6 further comprising a housing configured in a form selected from the group consisting of humanoid, animate, vehicular and natural.

9. The device of claim 8 wherein the housing has a movable portion.

10. The device of claim 6 wherein the device comprises a video display.

* * * * *